US 6,713,978 B2

(12) United States Patent
Parlos et al.

(10) Patent No.: US 6,713,978 B2
(45) Date of Patent: Mar. 30, 2004

(54) METHOD AND SYSTEM FOR DETERMINING INDUCTION MOTOR SPEED

(75) Inventors: Alexander G. Parlos, College Station, TX (US); Raj M. Bharadwaj, Clisdon Park, NY (US)

(73) Assignee: Texas A&M University System, College Station, TX (US)

( * ) Notice: Subject to any disclaimer, the term of this patent is extended or adjusted under 35 U.S.C. 154(b) by 0 days.

(21) Appl. No.: 10/197,881

(22) Filed: Jul. 18, 2002

(65) Prior Publication Data

US 2003/0065634 A1 Apr. 3, 2003

Related U.S. Application Data

(60) Provisional application No. 60/306,291, filed on Jul. 18, 2001, and provisional application No. 60/308,226, filed on Jul. 27, 2001.

(51) Int. Cl.⁷ .............................................. G05B 13/00
(52) U.S. Cl. ................... 318/268; 318/561; 318/621; 318/632; 318/812
(58) Field of Search ................... 318/268, 600, 318/601, 621, 632, 561, 806, 807, 812; 388/907.5

(56) References Cited

U.S. PATENT DOCUMENTS

| | | | |
|---|---|---|---|
| 5,296,794 A | * 3/1994 | Lang et al. .................. | 318/715 |
| 5,298,847 A | * 3/1994 | Kerkman et al. ........... | 318/800 |
| 5,467,025 A | 11/1995 | Ray | |
| 5,745,382 A | 4/1998 | Vilim et al. | |
| 5,811,957 A | * 9/1998 | Bose et al. .................. | 318/802 |
| 6,008,618 A | * 12/1999 | Bose et al. .................. | 318/811 |
| 6,069,467 A | 5/2000 | Jansen | |
| 6,137,258 A | * 10/2000 | Jansen ......................... | 318/802 |
| 6,288,513 B1 | 9/2001 | Green | |
| 6,301,572 B1 | 10/2001 | Harrison | |
| 6,353,302 B1 | * 3/2002 | Ramachandran et al. ... | 318/727 |
| 6,388,420 B1 | 5/2002 | Jansen et al. | |
| 6,577,096 B2 | * 6/2003 | Cho ............................ | 318/727 |
| 6,590,362 B2 | * 7/2003 | Parlos et al. ................ | 318/799 |

OTHER PUBLICATIONS

First Author: Bharadwaj Abstract entitled "A Neural Network–Based Speed Filter for Induction Motors: Adapting to Motor Load Changes" from IJCNN (1999).
First Author: Bharadwaj Paper entitled "A Neural Network–Based Speed Filter for Induction Motors: Adapting to Motor Load Changes" from IJCNN (1999).
First Author: Bharadwaj Presentation document entitled "A Neural Network–Based Speed Filter for Induction Motors: Adapting to Motor Condition Changes" (1999).
First Author: Bharadwaj Paper entitled "Adaptive Neural Network–Based State Filter for Induction Motor speed Estimation" from IECON (1999).
First Author: Bharadwaj Presentation paper entitled "Adaptive Neural Network–Based State Filter for Induction Motor Speed Estimation" from IECON (1999).

(List continued on next page.)

Primary Examiner—Bentsu Ro
(74) Attorney, Agent, or Firm—Bracewell & Patterson, LLP (57) ABSTRACT

A non-linear, semi-parametric neural network-based adaptive filter is utilized to determine the dynamic speed of a rotating rotor within an induction motor, without the explicit use of a speed sensor, such as a tachometer, is disclosed. The neural network-based filter is developed using actual motor current measurements, voltage measurements, and nameplate information. The neural network-based adaptive filter is trained using an estimated speed calculator derived from the actual current and voltage measurements. The neural network-based adaptive filter uses voltage and current measurements to determine the instantaneous speed of a rotating rotor. The neural network-based adaptive filter also includes an on-line adaptation scheme that permits the filter to be readily adapted for new operating conditions during operations.

15 Claims, 3 Drawing Sheets

OTHER PUBLICATIONS

First Author Zamora "Rotor Speed Estimator for Induction Motors Using Voltage and Current Measurements" from Control Engineering Practice 6 (1998) 369–383.

First Author Schauder "Adaptive Speed Identification for Vector Control of Induction Motors without Rotational Transducers" from IEEE Transactions of Industry Applications, vol. 28, No. 5 (Sep./Oct. 1992).

First Author Buja "Accuracy of the Speed Estimation in the Sensorless Induction Motor Drives Based on the MRAS Technique".

First Author Armstrong "A Comparison of Estimation Techniques for Sensorless Vector Controlled Induction Motor Drives," IEEE (1997).

First Author: Hurst "Sensorless Speed Measurement Using Current Harmonic Spectral Estimation in Induction Machine Drives," IEEE Transactions on Power Electronics, vol. 11, No. 1 (Jan. 1996).

First Author Blasco–Gimenez "Performance of FFT–Rotor Slot Harmonic Speed Detector for Sensorless Induction Motor Drives," IE Proceedings Elctr. Power Appl. vol. 143, No. 3 (May 1996).

First Author Orlowska–Kowalska "Neural network Application for Flux and Speed Estimation in the Sensorless Induction Motor Drive," IEEE Catalog No. 97TH82890 (1997).

First Author Mehrotra "Speed Estimation of Induction Motor Using Artificial Neural Networks," IEEE (1996).

First Author Ben–Brahim "Identification of Induction Motor speed Using Neural Networks," TH0406 (1993) IEEE.

First Author Kazmierkowski "Sensorless Control of Induction Motor Using a Neural network for speed Estimation," IEEE Catalog No. 97TH8280 (1997).

First Author Stronach "Design, DSP Implementation and Performance of Artificial–Intelligence–Based sped Estimator for Electromechanical Drives," IEEE Proc. Control Theory Appl. vol. 145, No. 2 (Mar. 1998).

First Author Ferrah "A Speed Identifier for Induction Motor Drives Using Real–Time Adaptive Digital Filtering," IEEE Transactions on Industry Applications, vol. 34, No. 1 (Jan./Feb. 1998).

First Author Benbouzid "A Review of Induction Motors Signature Analysis as a Medium for Faults Detection," IEEE (1998).

First Author Schoen "Effects of Time Varying Loads on Rotor Fault Detection in Induction Machines," IEEE Transactions on Industry Applications, vol. 31, No. 4 (Jul./Aug. 1995).

Monitoring, IEEE Transactions on Industry Applications, vol. 31, No. 6 (Nov./Dec. 1995).

First Author Thomson "On Line Current Monitoring for Fault Diagnosis in Inverted Fed Induction Motors".

First Author Benbouzid "Induction Motors' Faults Detection and Localization Using Stator Current Advanced Signal Processing Techniques," IEEE Transactions on Power Electronics, vol. 14, No. 1 (Jan. 1999).

First Author Yazici "An Adaptive Statistical Time–Frequency Method for Detection of Broken Bars and Baring Faults in Motors Using Stator Current," IEEE Transactions on Industry Applications, vol. 35, No. 2 (Mar./Apr. 1999).

First Author Hayasi "Study of machine Fault Diagnosis System Using Neural Networks," IEEE (2002).

First Author Filippetti "Recent Developments of Induction Motor Drives Fault Diagnosis Using AI Techniques," IEEE Transactions on Industrial Electronics, vol. 47, No. 5 (Oct. 2000).

* cited by examiner

METHOD AND SYSTEM FOR DETERMINING INDUCTION MOTOR SPEED

CROSS-REFERENCE TO RELATED APPLICATIONS

The present application claims the priority of a provisional patent application Ser. No. 60/306,291, filed Jul. 18, 2001, and a provisional patent application Ser. No. 60/308,226, filed Jul. 27, 2001. The entirety of the provisional patent application Ser. No. 60/306,291 is incorporated herein by reference.

The present invention was made under government Grant No. DE-FG07-98ID13641, awarded by the Department of Energy. The United States Government has a paid-up license in the present invention and the right, in limited circumstances, to require the patent owner to license others on reasonable terms as provided for under the terms of Grant No. DE-FG07-98ID13641.

BACKGROUND OF THE INVENTION

1. Technical Field

The present invention relates to a method and system for determining the speed of induction motors in general, and in particular to a neural network-based method and system for determining the dynamic speed of induction motors.

2. Description of the Related Art

Induction motors are commonly found in power plants and various types of manufacturing facilities throughout the world. An induction motor typically includes a stationary stator and a rotatable rotor. The ability to accurately determine the speed of a rotating rotor with respect to a stationary stator within an induction motor is vitally important to the every day operations of induction motors. However, it is generally undesirable to introduce transducers or other physical sensors for measuring the speed or the position of a rotating rotor because of the additional cabling and increased costs. For example, for a small motor, such as 5 horsepower or less, the cost of speed sensor installation could be comparable to the cost of the motor itself. Also, the probability of failure of the speed sensor is higher than the probability of failure of the small motor.

Hence, sensorless rotor speed estimation methods (or non-intrusive rotor speed estimation methods) have emerged as a cost-effective alternative over the sensor-based rotor speed estimation methods. Sensorless rotor speed estimation methods generally fall under one of the following two categories, this is, either by using an induction motor model, or by analyzing the rotor slot harmonic (RSH) content of the stator current waveform.

The model based speed estimation methods are inconvenient because they have to rely on detailed motor parameters, i.e., a priori knowledge of the motor's electrical (and in some cases mechanical) characteristics, in order to operate properly. However, those parameters are typically available only to the designer of the motor. Further, many motor based speed estimation methods assume linear motor models and time invariant parameters, which leads to poor speed estimation. The RSH based speed estimation methods are not completely acceptable either because they sometimes perform poorly at low motor speeds due to difficulty in tracking low frequency harmonics. Additionally, RSH based speed estimation methods require the calculation of the Fast Fourier Transform (FFT) of the stator current, and as a result, RSH based speed estimation methods inherit all the typical limitations of an FFT based scheme. For example, for an accurate calculation of the RSH, a relatively higher frequency resolution is required (typically in the range of 1–2 Hz), which implies longer data windows. Also, for certain rotor-stator slot combinations, primarily those at lighter loads, the RSH may not be readily detectable. While the transient speed can be calculated by using a moving window, it leads to poor time localization of the estimated speed response. Moreover, FFT based schemes are computationally burdensome for real-time implementation, and more expensive data processing equipment is needed, which would offset any cost advantages the RSH based speed estimation methods might deliver.

Consequently, it would be desirable to provide an improved sensorless method and system for determining the dynamic speed of a rotating rotor.

SUMMARY OF THE INVENTION

In accordance with a preferred embodiment of the present invention, a non-linear, semi-parametric neural network-based adaptive filter is utilized to determine the dynamic speed of a rotating rotor within an induction motor, without the explicit use of a speed sensor, such as a tachometer. The neural network-based filter is developed using actual motor current measurements, voltage measurements, and nameplate information. The neural network-based adaptive filter is trained using an estimated speed $\omega_{RSH}$ calculator derived from the actual current and voltage measurements. The training of the neural network-based adaptive filter takes place off-line; thus, time lags resulting from the FFT-based estimation can be compensated. The neural network-based adaptive filter uses voltage and current measurements to determine the instantaneous speed of a rotating rotor. The neural network-based adaptive filter also includes an on-line adaptation scheme that permits the filter to be readily adapted for new operating conditions during operations and for adaptation to new motors, though the on-line adaptation scheme needs only to be used infrequently.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
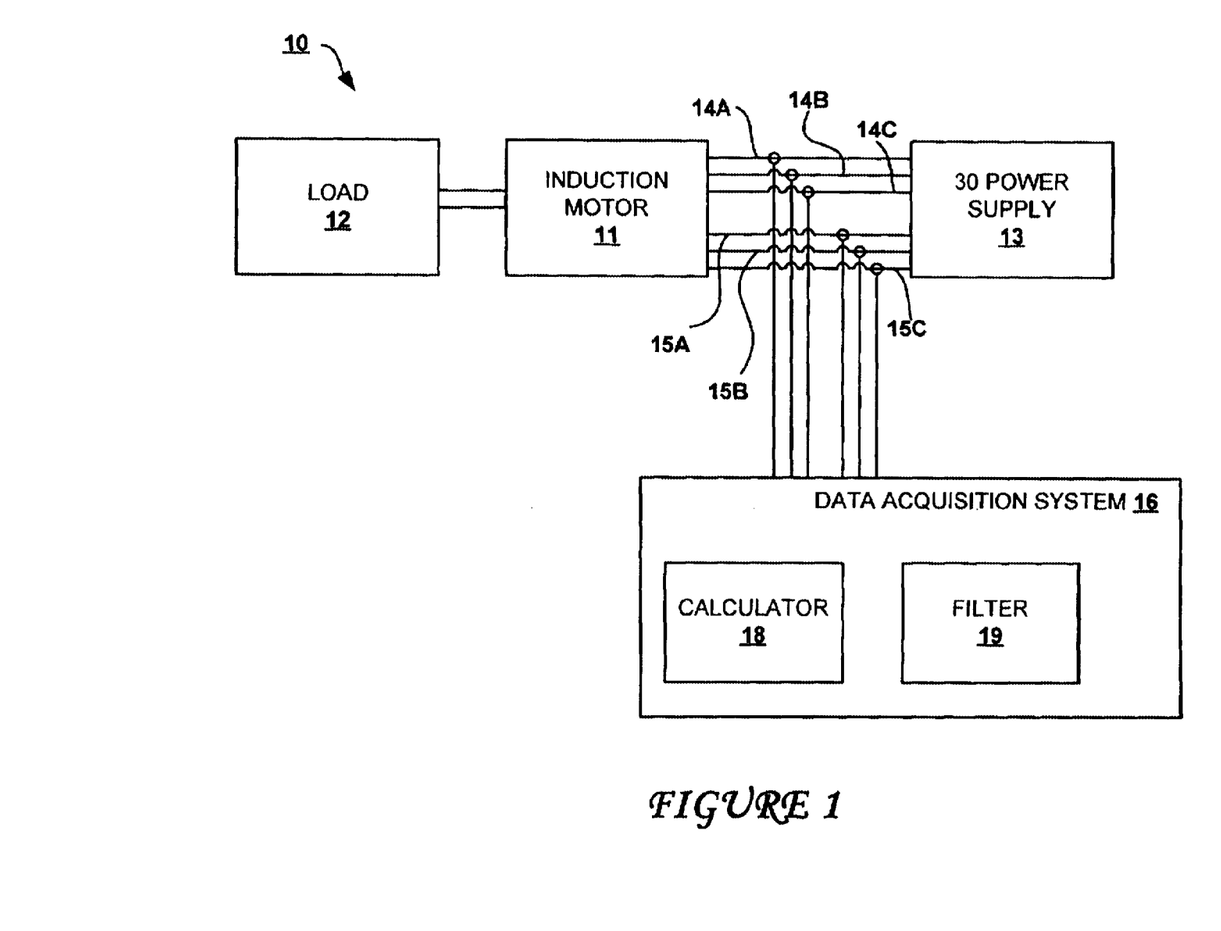
FIG. 1 is a block diagram of an induction motor assembly, in accordance with a preferred embodiment of the present invention.

Referring now to the drawings and in particular to FIG. 1, there is depicted a block diagram of an induction motor assembly, in accordance with a preferred embodiment of the present invention. As shown, an induction motor assembly 10 includes an induction motor 11, a three-phase power supply 13, and a data acquisition system 16. Induction motor 11 is preferably a three-phase motor that is powered by three-phase power supply 13 via three voltage inputs 14a–14c and three current inputs 15a–15c. It is understood by those skilled in the art that induction motor 11 can be of any size having any number of phases. Induction motor 11 is shown to be connected to a load 12. Data acquisition system 16 is operably associated with each of voltage inputs 14a–14c and each of current inputs 15a–15c via a respective hall-effect detector (not shown) that is well-known to those skilled in the art. The hall-effect detectors can unintrusively detect or measure the voltage values at voltage inputs 14a–14c and the current values at current inputs 15a–15c without affecting the normal operations of induction motor 11. Data acquisition system 16 may be implemented with a data processing system having a general purpose processor or a digital signal processor, that is well-known to those skilled in the art. Data acquisition system 16 includes a speed ($\omega_{RSH}$) calculator 18 and a neural network adaptive filter 19. Neural network adaptive filter 19 is used to determine the speed of a rotating rotor within induction motor 11 via a "filtering" process. "Filtering," as used herein, refers to the estimation of a variable of interest at the present time, given data measurements up to and including the present time.

I. Problem Statement

Consider a discrete time representation of a general nonlinear state-space model, $$x(t+1)=f(x(t), u(t))+w(t) \quad y(t)=h(x(t))+v(t) \tag{1}$$

where t=1, 2, ... is the discrete time instant, y(t) is the n×1 output vector of the nonlinear state-space model; u(t) is the m×1 input vector; x(t) is the state vector of the model; f and h are vector-valued unknown nonlinear functions; w(t) is the process noise; and v(t) is the measurement noise. It is assumed that w(t) and v(t) are independent zero-mean, white Gaussian vectors.

The objective of the state filtering problem is to estimate, $\hat{x}(t)$, for the state x(t). In linear state filtering, the notation used to denote the above-mentioned state estimate is important, because depending on the chosen filtering method, different optimal state estimates are obtained. Nevertheless, in real-world nonlinear filtering problems, the resulting state estimates are not optimal in any sense. Therefore, the notation $\hat{x}(t|t)$ is utilized to mean the state estimate at time t, following the update resulting from the u(t) and y(t) measurements at time t. This should not be interpreted to imply an optimal state estimate in the minimum variance or any other sense.

II. Neural Network Method of Filtering

The state filter utilizing neural networks assumes that the system under consideration is governed by equations (1), though the functions f(·) and h(·) are assumed to be unknown. It is also assumed that the value of input u(t), output y(t) and state x(t) can be measured or computed for off-line purposes. Appropriate neural networks are used to develop approximations of the functions entering the filter equations. The state-space equations (1) can be rewritten in their innovation form as follows:

$$\hat{x}(t+1|t)=f_{innov}(\hat{x}(t|t-1), u(t), \epsilon(t)) \tag{2}$$

$$\hat{y}(t+1|t)=h_{innov}(\hat{x}(t|t-1), u(t), \epsilon(t)) \tag{3}$$

where $f_{innov}(.)$ and $h_{innov}(.)$ are nonlinear functions related to f(.) and h(.).

The innovations function, $\epsilon(t)$ is defined as $Y(t)-\hat{Y}(t|t-1)$, where Y(t) and $\hat{Y}(t|t-1)$ are defined as follows:

$$Y(t)=[y(t), y(t-1), \ldots, y(t-n_y)] \tag{4}$$

$$\hat{Y}(t|t-1)=[\hat{y}(t|t-1),\hat{y}(t-1|t-2), \ldots, \hat{y}(t-n_y|t-n_y-1)] \tag{5}$$

The innovations term in the state filter accounts for stochastic effects and system modeling uncertainties unpredictable by the prediction step. Therefore, in the innovations form of the state-space representation given by equation (2), the state prediction $\hat{x}(t|t-1)$ is updated by the innovations term $\epsilon(t)$. The filtered state, $\hat{x}(t|t)$, is obtained by correcting the predicted state $\hat{x}(t|t-1)$ using the innovations term, $\epsilon(t)$.

Thus, the state and output predictor equations for an adaptive filter can be written as:

$$\hat{x}(t+1|t)=f^*(\hat{x}(t|t),u(t),\hat{Y}(t|t-1))$$

$$\hat{y}(t+1|t)=h^*(\hat{x}(t|t),u(t),\hat{Y}(t|t-1)) \tag{6}$$

where f*(.) and h*(.) are nonlinear functions.

The nonlinear functions f*(.) and h*(.) can be approximated by a neural network, which can be represented as:

$$f^*(.) \approx f_{NN}(.)$$

$$h^*(.) \approx h_{NN}(.) \tag{7}$$

where $f_{NN}(.)$ and $h_{NN}(.)$ are either feed-forward multi-layer perceptrons (FMLP) or recurrent multi-layer perceptrons (RMLP) for approximating the state and output predictor equations.

The state update after the observation of a $(t+1)^{th}$ sample can be written as follows:

$$\hat{x}(t+1|t+1)=K_{NN}(\hat{x}_{NN}(t+1|t),y(t+1),\epsilon(t+1)) \tag{8}$$

where the vectors are defined as $$Y(t+1)=[y(t+1),y(t), \ldots ,y(t-n_y+1)]^T \tag{9}$$

$$\epsilon(t+1)=[\in(t+1),\in(t), \ldots ,\in(t-n_e+1)] \tag{10}$$

and $$\in(t+1)=y(t+1)-\hat{y}_{NN}(t+1|t) \tag{11}$$

is the innovations term as defined in the standard Kalman filter.

Figure 2:
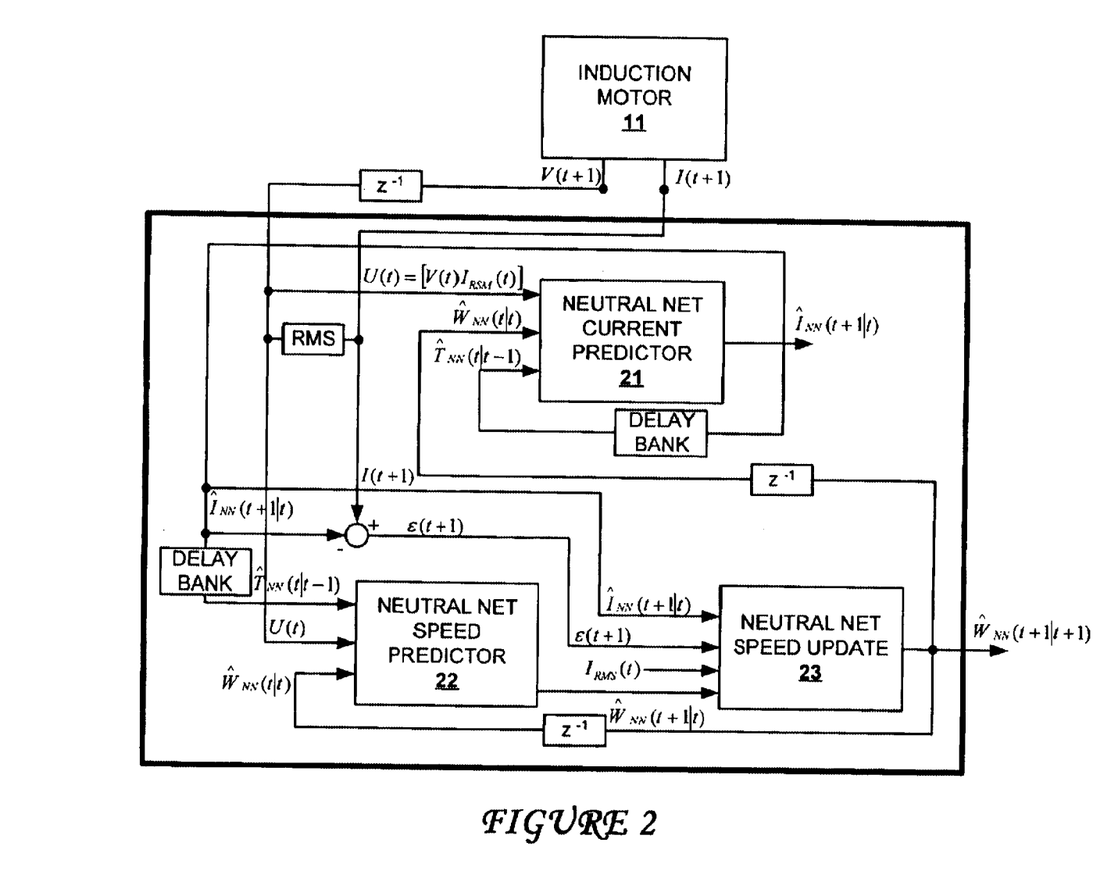
FIG. 2 is a detailed block diagram of a neural network adaptive filter within the induction motor assembly from FIG. 1, in accordance with a preferred embodiment of the present invention.

A neural network is used to develop approximations of functional relations and gains entering a recursive filter solution. In the present implementation, three neural networks are needed to be trained for a neural network adaptive filter such as neural network adaptive filter 19 from FIG. 1. With reference now to FIG. 2, there is illustrated a detailed block diagram of neural network adaptive filter 19, in accordance with a preferred embodiment of the present invention. As shown, neural network adaptive filter 19 includes three neutral networks, namely, a neural net current predictor 21, a neural net speed predictor 22 and a neural net speed update block 23. Neural net current predictor 21 and neural net speed predictor 22 are the output and state predictor networks, which can be represented by functions $f_{NN}(.)$ and $h_{NN}(.)$, respectively. Neural net speed update block 23 is the filter update network that can be represented by function $K_{NN}(.)$. Neural net current predictor 21 and neural net speed predictor 22, which may be approximated by either FMLPs or RMLPs, represent dynamic mappings and can be trained using "teacher forcing" (TF) or "global feedback" (GF). Neural net speed update block 23, which may be approximated by FMLPs, represents a static (memory-less) mapping that requires no training. Voltage measurement values, V(t+1), and current measurement values, I(t+1), from induction motor 11 are supplied to neural network adaptive filter 19.

a. Off-line Training (for Learning)

The off-line training is divided into two phases: first, the output predictor is developed, followed by the state predictor network; second, the state update network is then developed. In the first phase of the off-line training process, FMLP or RMLP networks are used and they are trained using TF. The error function to be minimized for neural net current predictor 21 (i.e., the output predictor network) is given by $$E_1 \equiv \sum_{t=0}^{NP} E_1(t) \equiv \sum_{t=0}^{NP} \sum_{k=1}^{n} [\hat{y}_{NN,k}(t \mid t-1) - y_{target,k}(t)]^2 \quad (12)$$

where $\hat{y}_{NN,k}(t|t-1)$ and $y_{target,k}(t)$ are the $k^{th}$ components of $\hat{y}_{NN,k}(t|t-1)$ and $y_{target}(t)$, the measured/computed states, and where n is the number of outputs included in the training. The error function to be minimized for neural net speed predictor 22 (i.e., the state predictor network) is given by:

$$E_2 \equiv \sum_{t=0}^{NP} E_2(t) \equiv \sum_{t=0}^{NP} \sum_{k=1}^{l} [x_{NN,k}(t \mid t-1) - x_{target,k}(t)]^2 \quad (13)$$

where $\hat{x}hd\ NN,k(t|t-1)$ and $x_{target,k}(t)$ are the $k^{th}$ components of $\hat{x}hd\ NN,k(t|t-1)$ and $x_{target}(t)$, the measured/computed states, and where l is the number of states included in the training. The error function to be minimized for neural net speed update block 23 (i.e., filter update network) is given by:

$$E_3 \equiv \sum_{t=0}^{NP} E_3(t) \equiv \sum_{t=0}^{NP} \sum_{k=1}^{l} [x_{NN,k}(t \mid t) - x_{target,k}(t)]^2 \quad (14)$$

The error gradients for an FMLP and/or RMLP network trained with TF can be obtained by using the chain rule. The detailed computation of these gradients are well-known in the art and can be found in many recurrent network references.

In the second phase of the off-line training process, the training is performed using GF. The error function minimized for neural net current predictor 21, neural net speed predictor 22, and neural net speed update block 23 are similar to equations (12)–(14), respectively. However, in the second phase, the multi-step state update error is minimized because the output predictor response is used in the state predictor and state update networks, instead of output observations. Similarly, the error functions of the output and the state predictors are such that the multi-step ahead prediction errors are minimized instead. The only observations used in this phase of the off-line training as network inputs are the current and past system inputs u(t). All other variables are generated by one of the three networks involved in the state filter. The detailed computation of the error gradients involved in the off-line training phase with GF are well-known in the art and can be found in many recurrent network references.

The training data include system inputs and output values, and the state associated with these inputs and outputs. The evaluation (or cross-validation) data set is collected in a similar manner as the training data set.

b. On-line Training (for Learning)

On-line learning of state filter networks, whether FMLP or RMLP, is complicated by the fact that the only measurements available are those of the system inputs and outputs, u(t) and y(t), respectively. Therefore, in order to correct for deviations in the filtered state value, $\hat{x}_{NN}(t|t)$, the updates for the weights and biases must be determined from the output residual term $\in(t)$.

As in the first phase of the off-line training, the networks are decoupled and treated separately during on-line training. For all networks, only a single-step-ahead gradient propagation training is considered because on-line learning with GF becomes exceedingly impractical. Such approximation has minimal impact on the performance of the on-line filtering algorithm. During on-line training, the error function to be minimized is of the form:

$$E(t+1) \equiv \sum_{k=1}^{n} [\hat{y}_{NN,k}(t+1 \mid t) - y_{target,k}(t+1)]^2 \quad (15)$$

where all variables are as defined previously. The error gradients used in off-line training must be modified for use in the on-line training. The error gradients for neural net current predictor 21 (i.e., the output predictor network) can be expressed as follows:

$$\frac{\partial E(t+1)}{\partial w_{h_{NN}}} = 2[\hat{y}_{NN}(t+1 \mid t) - y_{target}(t+1)]^T \partial \frac{h_{NN}}{\partial w_{h_{NN}}} \quad (16)$$

where $wh_{NN}$ is defined as the vector containing the weights and biases of neural net current predictor 21. For neural net speed predictor 22 (i.e., the state predictor network), the equivalent on-line training gradient can be expressed as follows:

$$\frac{\partial E(t+1)}{\partial w_{f_{NN}}} = \quad (17)$$

$$2[\hat{y}_{NN}(t+1 \mid t) - y_{target}(t+1)]^T \frac{\partial h_{NN}}{\partial x_{NN}(t \mid t)} \frac{\partial K_{NN}}{\partial x_{NN}(t \mid t-1)} \frac{\partial f_{NN}}{\partial w_{f_{NN}}}$$

where $wf_{NN}$ is defined as the vector containing the weights and biases of neural net speed predictor 22. Finally, the error gradient for neural net speed update block 23 (i.e., the filter update network) can be expressed as $$\frac{\partial E(t+1)}{\partial w_{K_{NN}}} = 2[\hat{y}_{NN}(t+1 \mid t) - y_{target}(t+1)]^T \frac{\partial h_{NN}}{\partial x_{NN}(t \mid t)} \frac{\partial f_{NN}}{\partial w_{K_{NN}}} \quad (18)$$

where $wK_{NN}$ is defined as the vector containing the weights and biases of neural net speed update block 23.

Depend on the specific architecture of the network used, the gradient contained in equations (16)–(18) can be computed using a sentivity-type network. For a FMLP network, the gradients can be obtained by using backpropagation-type procedure and for recurrent architecture, such as RMLP network. Once the error gradients are computed, the weight update is performed using the steepest descent rule.

III. Rotor Speed Determination Using Adaptive State Filtering

Since an induction motor model, represented by functions f(.) and h(.) in equations (1) are not available, thus, appropriate neural networks are used to develop approximations of the functions entering filter equations. Such approach of state filtering is considered adaptive since an empirical model must be constructed initially. However, it is assumed that the motor voltage and current measurements are available, which are used to identify an inductor motor model. Further, only name plate information, such as number of pole pairs (p), slip at rated load ($f_{s(rated)}$) no load slip ($f_{nl}$), are used to calculated the speed targets $\omega_{RSH}$ form the motor line current. Further, only the measured motor terminal currents and voltage along with the inferred speed ($\omega_{RSH}$) are required for the development of neural network adaptive filter 19.

The nonlinear state space equations (1) are rewritten in their innovations form for induction motor speed estimation, as follows:

$$\hat{\omega}_{NN}(t+1|t) = f_{innov}(\hat{\omega}_{NN}(t|t1), U(t), \epsilon(t)) \quad (19)$$

$$\hat{I}_{NN}(t+1|t) = h_{innov}(\hat{\omega}_{NN}(t|t1), U(t), \epsilon(t)) \quad (20)$$

where $f_{innov}(.)$ and $h_{innov}(.)$ are nonlinear functions, $\omega_{NN}(.)$ is the neural network estimate of the mechanical speed of the induction motor, $\hat{\omega}_m(.)$, $U(.) = [V(.), I_{RMS}(.)]$ for motor running off the mains, $V(.)$ and $I(.)$ represent the measured motor line voltages and currents. For the inverter fed induction motor $U(.) = [V(.), I_{RMS}(.), f_1(.)]$, where $f_1(.)$ is the fundamental frequency of the input voltage.

The innovations function, $\epsilon(t)$, is defined as $$\in(t) = I(t) - \hat{I}_{NN}(t|t-1) \quad (21)$$

where $\hat{I}_{NN}(t|t-1)$ is defined as $$\hat{I}_{NN}(t|t+1) = [\hat{I}_{NN}(t|t-1), \hat{I}_{NN}(t-1|t-2), \ldots, \hat{I}_{NN}(t-n_1+1|t-n_1)]^T \quad (22)$$

The speed filter is setup in a predictor-corrector (update) form. In the state-space representation of the induction motor given by equation (19), the speed prediction $\omega(t|t-1)$ is updated by the innovations term, $\epsilon(t)$. The update step uses most recent motor current measurement and prediction in the innovations form to correct for stochastic and/or modeling inaccuracies. Therefore, in the prediction step only most relevant signals are required for computing $\hat{\omega}_{NN}(t+1|t)$: the filtered speed value $\hat{\omega}_{NN}(t|t)$, the measured input line voltages, and the present and/or past motor line current predictions, $\hat{I}_{NN}(t|t-1)$, or motor current measurement, $I(t)$. In the state prediction equation $\hat{I}_{NN}(t|t-1)$ is also used.

The motor speed estimates, $\hat{\omega}_{NN}(t+1|t+1)$, are obtained using the following two steps:

Step 1 (prediction step)—before observing a $(t+1)^{th}$ sample:

The motor speed and current predictor values are obtained using the following equations:

$$\hat{\omega}_{NN}(t+1|t) = f_{NN}(\hat{\omega}_{NN}(t|t), U(t), \hat{I}_{NN}(t|t-1))$$

$$\hat{I}_{NN}(t+1|t) = h_{NN}(\hat{\omega}_{NN}(t|t), U(t), \hat{I}_{NN}(t|t-1)) \quad (23)$$

where $\hat{I}_{NN}(t|t-1)$ is a vector containing present and past motor current predictor responses.

Step 2 (update step)—after observing the $(t+1)^{th}$ sample:

$$\hat{\omega}_{NN}(t+1|t+1) = K_{NN}(\hat{\omega}_{NN}(t+1|t), \hat{I}_{NN}(t+1|t), I_{RMS}(t+1), \epsilon(t+1)) \quad (24)$$

where the function $K_{NN}(.)$ is a FMLP used to approximate the filter gain, and the vectors are defined as $$I(t+1) = [I(t+1), I(t), \ldots, I(t-n_I+1)]^T$$

$$\epsilon(t+1) = [\in_{NN}(t+1), \in_{NN}(t), \ldots, \in_{NN}(t-n_e+1)]^T \quad (25)$$

where $$\in(t+1) = I(t+1) - \hat{I}_{NN}(t+1|t) \quad (26)$$

is the innovations term.

For an inverter fed induction motor, the speed update equation can be written as $$\hat{\omega}_{NN}(t+1|t+1) = K_{NN}(\hat{\omega}_{NN}(t+1|t), \hat{I}_{NN}(t+1|t), fl_1(t+1), \epsilon(t+1)) \quad (27)$$

where all the quantities are as defined previously.

The motor speed estimate $\hat{\omega}_{NN}(t+1|t+1)$ output from neural net speed update block 23 in FIG. 2 represents the value computed during on-line use of neural network adaptive filter 19. Initially, neural network adaptive filter 19 is trained off-line using the shifted RSH-based speed estimates.

a. Off-line Adaptive Filter Training for Speed Estimation

Before the training is performed, it is assumed that some reliable speed information is available from experiments done on the system itself for a wide range of loading conditions or speed is extracted through off-line signal processing from motor voltage and current measurements. In the present implementation, the speed signal used in training is extracted by the latter method. It should be noted that the accuracy of neural network speed filter will depend on the accuracy of the speed signal used for training. The evaluation (or cross-validation) data set is collected in a similar manner to the training data set.

Based on the discussion on off-line training in the previous section, the training is divided into two phases. In the first phase, the line current predictors are developed, followed by the development of the speed predictor. In the second phase, the state update network is developed. In the first stage, all the networks are developed separately, and inputs to the output and state predictor networks are the present and past voltage, current samples and the speed are obtained. For developing the filter update network, the current predictor network is run to generate the innovations term. The error function to be minimized for the output predictor network can be given as $$E_1 \equiv \sum_{t=0}^{NP} E_1(t) \equiv \sum_{t=0}^{NP} \sum_{k=1}^{I} [I_{NN,k}(t|t-1) - I_{target,k}(t)]^2$$

The error function for the speed predictor network can be given as where $\omega_{RSH}(.)$ is the network target.

$$E_2 \equiv \sum_{t=0}^{NP} E_1(t) \equiv \sum_{t=0}^{NP} [\omega_{NN}(t|t-1) - \omega_{RSH}(t)]^2$$

Finally, the filter update network is constructed using FMLP. The error function to be minimized for the filter update network is given by $$E_3 \equiv \sum_{t=0}^{NP} E_3(t) \equiv \sum_{t=0}^{NP} [\omega_{NN}(t|t) - \omega_{RSH}(t)]^2$$

i. Using RSH to Compute Speed

The rotor slots produce airgap permeance waves with a spatial distribution dependent on the number of rotor slots, R. The slots produce a continuous variation of the air-gap permeance in squirrel-cage induction. This distribution is dependent on the number of rotor slots, R. During operation, the rotor-slot MMF harmonics will interact with the fundamental component of the air-gap flux because of the stator current. Normally, the magnitude of these flux harmonics varies little, except in machines with closed rotor slots.

Similar airgap flux harmonics occur from the rotor slot harmonics. Therefore, the air-gap flux will be modulated by the passing rotor slots. Since the rotor is slot harmonics are directly related to the rotor currents, their magnitude reduces with decreasing load. For a sinusoidally fed machine the expression for slot harmonic can be given as, $$\omega_{sh} = \frac{R}{p}(\omega_r \pm \omega_1)$$

where p is number of pole pairs, $\omega_{sh}$, $\omega_r$ and $\omega_1$ are angular slot harmonic frequency, rotor frequency and synchronous frequency, respectively. Accounting for the time harmonics present in the power supply and machine eccentricity the equation for slot harmonic can be given as $$f_{sh} = f_1\left[(kR \pm n_d)\frac{1-s}{P} \pm v\right]$$

where k=0, 1, 2, . . . ; R is the number of rotor slots, $n_d$=0, ±1, . . . ; ($n_d$ is known as eccentricity order), s is the per unit slip, P is the number of pole pairs, v=±1, ±3, . . . is the order of stator time harmonics that are present in the power supply. Due to the interaction of 6k±1 harmonics with the rotor slot permeance wave there is a periodicity of slot harmonics.

In order to use equation (2) to calculate the slip, it is necessary to know $n_d$, v and R. In the present implementation, only the motor nameplate information is used along with the initialization method. Since the eccentricity-related harmonic was not automatically detectable for the given induction motor (3-phase, 3 hp) in the present implementation, the slip in the initialization algorithm was calculated by using the no-load and full-load slip and rms motor current (assuming motor operation in the linear region).

The induction motor speed, $\omega_{RSH}$, can then be calculated using the slot harmonic frequency at any slip condition from the following expression $$\omega_{RSH} = \frac{60}{R}(f_{sh} \pm f_1)$$

An FFT-based algorithm with multiple windowing and with spectral abasing was used. This approach is an integration of the time-windowing and spectral abasing methods. The search window is given by $$\Delta f_{SH} = \frac{R}{P}(f_{s(RATED)} - f_{nl})$$

where the value of ($f_{s(RATED)}$) is derived from nameplate information, and for the experimental set-up used in this study is found to be 3.5 Hz, corresponding to a slip of 5.83% of rated speed (60 Hz). The value of $f_{nl}$ is the slip corresponding to no-load (0.1 Hz). The use of $f_{nl}$ improves speed estimation at no load.

A data buffer of 20 cycles (sampled at 3840 Hz) with windowing is used to find the RSH. Since 20 cycles of data is needed to calculate the speed, the RSH estimate lags the actual speed by about 10 cycles. The training set if formed by shifting the estimated speed signal by 10 cycles to compensate for this lag. The three line currents, the three line voltages, the rms of the average line currents along with speed estimated from the above harmonic analysis form neural network the training set.

b. On-line Adaptive Filter Training for Speed Estimation i. One-shot Tuning

It is well known that the neural networks give good performance as an interpolation tool. However, the performance of the network may not be good when the test data is outside the region of training. The response of the speed filter could drift due to changes in power supply condition or deteriorating machine health. The filter can be turned by using 12–13 cycles of data at steady-state. Since steady-state data is used in this method to update network weights, the RSH-based speed is only needed to be calculated once. The weights of the state predictor and state update network are adapted simultaneously. This method of tuning can be implemented on-line for real-time use.

ii. Short Iterative Tuning

If both steady-state and transient performance of the filter deteriorate due to large drift in operating conditions, one-shot tuning may not be sufficient to improve the performance. Then, some data with both transient and steady-state representative of the current machine condition should be used for iterative tuning. This type of tuning can be used on-line, though it cannot be executed fast enough for real-time implementation.

c. Adaptive Filter Description

In total, neutral network adaptive filter 19 includes five neural networks. Three RMLP networks with global feedback, each with structure 8-5-1, are used for the prediction of the three line currents. The three motor current predictors are trained using the motor voltages V(t); the motor currents I(t), rms of current $I_{rms}$(t), and RSH based speed estimate, $\omega_{RSH}$(t) using TF. When the validation error is satisfactory, the training is switched to GF. Now, instead of I(t), $\hat{I}_{NN}$(t|t−1) is used.

Neural net speed predictor 22, also an RMLP with structure 9-7-1, uses the delayed output of neural net current predictor 21, $\hat{I}_{NN}$(t|t−1); the rms line current, $I_{rms}$(t); the line voltages V(t) to predict the speed and delayed predicted speed, $\hat{\omega}_{NN}$(t|t−1). As in the case of current predictor, the training is started using TF, with $\omega_{RSH}$(t) as input. When the validation error is small the training, the training method is switched to global feedback with, $\hat{\omega}_{NN}$(t|t−1) is used. The use of TF in the beginning provides the global feedback training with a good starting point in the error-curver, this assists in convergence to a better solution. The predictor networks are evaluated for multi-step prediction capability. After the training of neural net speed predictor 22, neural net current predictor 21 are tuned with $\hat{\omega}_{NN}$(t|t−1) instead of $\omega_{RSH}$(t) as one of the inputs.

Neural net speed update block 23 uses the innovations from the current predictions, the current estimates and the output of the state predictor networks to generate the filtered speed estimate. For the speed filter network, FMLP network with 8-16-1 structure is used. After training the state filter network, $\hat{\omega}_{NN}$(t|t) instead of $\hat{\omega}_{NN}$(t|t−1) is used as input to the current predictor and state predictor networks. The networks are fine tuned if necessary.

Figure 3:
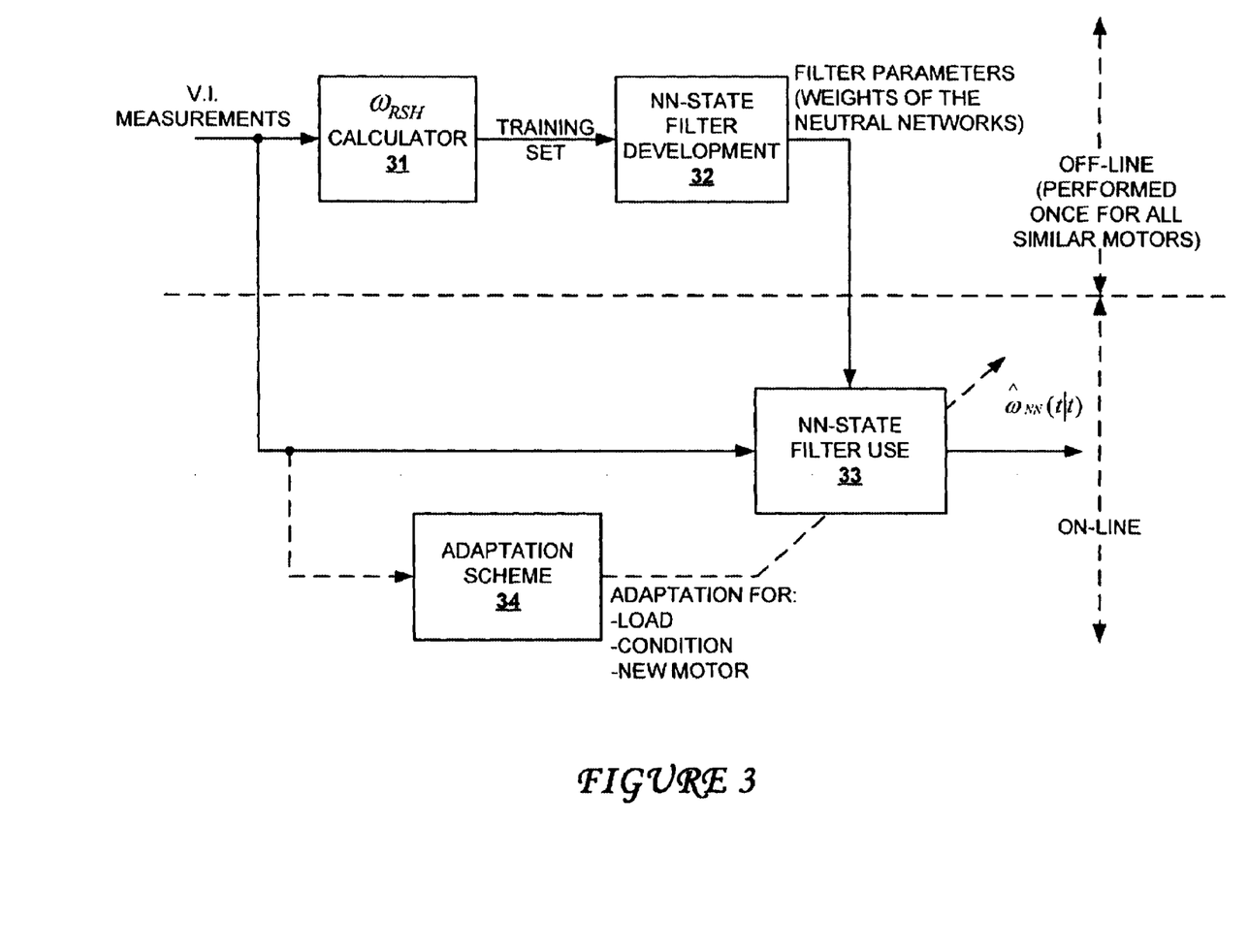
FIG. 3 is a logic flow diagram of a method for developing and using the neural network adaptive filter from FIG. 2, in accordance with a preferred embodiment of the present invention.

Referring now to FIG. 3, there is depicted logic diagram of a method for developing and using neural network adaptive filter 19, in accordance with a preferred embodiment of the present invention. As shown, voltage and current measurements are input to a $\omega_{RSH}$ calculation process 31 to generate a training data set. The training data set is utilized in a filter development process 32 to produce a set of filter parameters. Both $\omega_{RSH}$ calculation process 31 and filter development process 32 are performed off-line once for all similar motors. During on-line operation, the filter parameters are fed into a neural network adaptive filtering process

33 to generate $\hat{\omega}_{NN}(t|t)$ values. An on-line adaptation scheme 34 can also be used on-line to adjust filtering process 33.

As has been described, the present invention provides a neural network-based method and apparatus for determining the speed of induction motors. Although a three-phase induction motor is used to illustrate the present invention, the present invention is also applicable to any poly-phase motors, such as two-, five- and six-phase motors, inverter-fed motors, asynchronous motors, etc.

The methods of the present invention are advantageous in that they require so-called "nameplate" machine information only, rather than detailed design information for a motor. Nameplate information is a set of basic information pertaining to the identity of a motor, including the number of phases, frequency, rated voltage, rated current, rated power, and power factor. The methods of the present invention are capable of estimating machine speed over a wide range of load levels and despite machine deterioration due to wear and tear.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for determining the speed of a rotating rotor within a motor, said method comprising:

developing a neural network-based adaptive filter;

generating a set of filter parameters for said neural network-based adaptive filter with respect to said motor before operation of said motor;

measuring present and past current values along with present and past voltage values for one or more phases of said motor during operation; and determining a rotating speed of a rotating rotor within said motor during operation using said measured present and past current values along with said measured present and past voltage values of said motor via said neural network-based adaptive filter in conjunction with said set of filter parameters.

2. The method of claim 1, wherein said step of developing further includes developing a neural network-based adaptive filter having a neural net current predictor, a neural net speed predictor, and a neural net speed update block.

3. The method of claim 1, wherein said step of generating further includes generating said set of filter parameters based on name plate information of said motor.

4. The method of claim 3, wherein said name plate information includes number of pole pairs (p), slip at rated load ($f_{s(rated)}$) and no load slip ($f_{nl}$).

5. The method of claim 1, wherein said step of determining further includes determining a rotating speed estimates $\hat{\omega}_{NN}(t+1|t+1)$ by before observing a $(t+1)^{th}$ sample, determining a motor speed and current predictor values using $$\hat{\omega}_{NN}(t+1|t) = f_{NN}(\hat{\omega}_{NN}(t|t), U(t), \hat{I}_{NN}(t|t-1))$$

$$\hat{I}_{NN}(t+1|t) = h_{NN}(\hat{\omega}_{NN}(t|t), U(t), \hat{I}_{NN}(t|t-1))$$

where $\hat{I}_{NN}(t|t-1)$ is a vector containing present and past motor current predictor responses; and after observing said $(t+1)^{th}$ sample, determining said rotating speed estimates using $$\hat{\omega}_{NN}(t+1|t+1) = K_{NN}(\hat{\omega}_{NN}(t1|t), \hat{I}_{NN}(t+1|t), I_{RMS}(t+1), \epsilon(t+1))$$

where the function $K_{NN}(.)$ is a feed-forward multi-layer perceptrons (FMLP) used to approximate the filter gain, and the vectors are defined as $$I(t+1) = [I(t+1), I(t), \ldots, I(t-n_1+1)]^T$$

$$\epsilon(t+1) = [\epsilon_{NN}(t+1\epsilon_{NN}(t), \ldots, \epsilon_{NN}(t-n_c+1)]^T$$

where $$\epsilon(t+1) = I(t+1) - \hat{I}_{NN}(t+1|t)$$

is the innovations term.

6. A computer program product residing on a computer usable medium for determining the speed of a rotating rotor within a motor, said computer program product comprising:

program code means for implementing a neural network-based adaptive filter;

program code means for generating a set of filter parameters for said neural network-based adaptive filter with respect to said motor before operation of said motor;

program code means for measuring present and past current values along with present and past voltage values for one or more phases of said motor during operation; and program code means for determining a rotating speed of a rotating rotor within said motor during operation using said measured present and past current values along with said measured present and past voltage values of said motor via said neural network-based adaptive filter in conjunction with said set of filter parameters.

7. The computer program product of claim 6, wherein said program code means for implementing further includes program code means for implementing a neural network-based adaptive filter having a neural net current predictor, a neural net speed predictor, and a neural net speed update block.

8. The computer program product of claim 6, wherein said program code means for generating further includes program code means for generating said set of filter parameters based on name plate information of said motor.

9. The computer program product of claim 8, wherein said name plate information includes number of pole pairs (p), slip at rated load ($f_{s(rated)}$) and no load slip ($f_{nl}$).

10. The computer program product of claim 6, wherein said program code means for determining further includes program code means for determining a rotating speed estimates of $\hat{\omega}_{NN}(t+1|t+1)$ by program code means for determining a motor speed and current predictor values, before observing a $(t+1)^{th}$ sample, using $$\hat{\omega}_{NN}(t+1|t)=f_{NN}(\hat{\omega}_{NN}(t|t),U(t),\hat{I}_{NN}(t|t-1))$$

$$\hat{I}_{NN}(t+1|t)=h_{NN}(\hat{\omega}_{NN}(t|t),U(t),\hat{I}_{NN}(t|t-1))$$

where $\hat{I}_{NN}(t|t-1)$ is a vector containing present and past motor current predictor responses; and program code means for determining said rotating speed estimates, after observing said $(t+1)^{th}$ sample, using $$\hat{\omega}_{NN}(t+1|t+1)=K_{NN}(\hat{\omega}_{NN}(t1|t),\hat{I}_{NN}(t+1|t),I_{RMS}(t+1),\epsilon(t+1))$$

where the function $K_{NN}(.)$ is a feed-forward multi-layer perceptrons (FMLP) used to approximate the filter gain, and the vectors are defined as $$I(t+1)=[I(t+1),I(t),\ldots,I(t-n_f+1)]^T$$

$$\epsilon(t+1)=[\in_{NN}(t+1)\in_{NN}(t),\ldots,\in_{NN}(t-n_c+1)]^T$$

where $$\in(t+1)=I(t+1)-\hat{I}_{NN}(t+1|t)$$

is the innovations term.

11. A computer system for determining the speed of a rotating rotor within a motor, said computer system comprising:

means for implementing a neural network-based adaptive filter;

means for generating a set of filter parameters for said neural network-based adaptive filter with respect to said motor before operation of said motor;

means for measuring present and past current values along with present and past voltage values for one or more phases of said motor during operation; and means for determining a rotating speed of a rotating rotor within said motor during operation using said measured present and past current values along with said measured present and past voltage values of said motor via said neural network-based adaptive filter in conjunction with said set of filter parameters.

12. The computer system of claim 11, wherein said means for implementing further includes means for implementing a neural network-based adaptive filter having a neural net current predictor, a neural net speed predictor, and a neural net speed update block.

13. The computer system of claim 11, wherein said means for generating further includes means for generating said set of filter parameters based on name plate information of said motor.

14. The computer system of claim 13, wherein said name plate information includes number of pole pairs (p), slip at rated load ($f_{s(rated)}$) and no load slip ($f_{nl}$).

15. The computer system of claim 11, wherein said means for determining further includes means for determining a rotating speed estimates of $\hat{\omega}_{NN}(t+1|t+1)$ by means for determining a motor speed and current predictor values, before observing a $(t+1)^{th}$ sample, using $$\hat{\omega}_{NN}(t+1|t)=f_{NN}(\hat{\omega}_{NN}(t|t), U(t),\hat{I}_{NN}(t|t-1))$$

$$\hat{I}_{NN}(t+1|t)=h_{NN}(\hat{\omega}_{NN}(t|t), U(t),\hat{I}_{NN}(t|t-1))$$

where $\hat{I}_{NN}(t|t-1)$ is a vector containing present and past motor current predictor responses; and means for determining said rotating speed estimates, after observing a $(t+1)^{th}$ sample, using $$\hat{\omega}_{NN}(t+1|t+1)=K_{NN}(\hat{\omega}_{NN}(t1|t),\hat{I}_{NN}(t+1|t),I_{RMS}(t+1),\epsilon(t+1))$$

where the function $K_{NN}(.)$ is a feed-forward multi-layer perceptrons (FMLP) used to approximate the filter gain, and the vectors are defined as $$I(t+1)=[I(t+1),I(t),\ldots,I(t-n_f+1)]^T$$

$$\epsilon(t+1)=[\in_{NN}(t+1)\in_{NN}(t),\ldots,\in_{NN}(t-n_c+1)]^T$$

where $$\in(t+1)=I(t+1)-\hat{I}_{NN}(t+1|t)$$

is the innovations term.

* * * * *